(12) United States Patent
Krishnan et al.

(10) Patent No.: US 9,967,136 B2
(45) Date of Patent: May 8, 2018

(54) SYSTEM AND METHOD FOR POLICY-BASED SMART PLACEMENT FOR NETWORK FUNCTION VIRTUALIZATION

(71) Applicant: DELL PRODUCTS L.P., Round Rock, TX (US)

(72) Inventors: Ram Krishnan, Cupertino, CA (US); Anoop Ghanwani, Roseville, CA (US); Snigs Mukhopadhyay, San Jose, CA (US); Mohnish Anumala, Cupertino, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 220 days.

(21) Appl. No.: 15/082,916

(22) Filed: Mar. 28, 2016

(65) Prior Publication Data

US 2017/0279672 A1     Sep. 28, 2017

(51) Int. Cl.
| | |
|---|---|
| *G06F 15/177* | (2006.01) |
| *G06F 15/173* | (2006.01) |
| *H04L 12/24* | (2006.01) |
| *H04L 12/931* | (2013.01) |
| *G06F 9/455* | (2018.01) |
| *G06F 15/16* | (2006.01) |

(52) U.S. Cl.
CPC ...... *H04L 41/0803* (2013.01); *G06F 9/45558* (2013.01); *H04L 41/12* (2013.01); *H04L 49/70* (2013.01); *G06F 2009/4557* (2013.01); *G06F 2009/45595* (2013.01)

(58) Field of Classification Search
CPC ..... H04L 41/0803; H04L 41/12; H04L 49/70; G06F 9/45558; G06F 2009/4557; G06F 2009/45595

USPC ......................................................... 709/220
See application file for complete search history.

(56) References Cited

U.S. PATENT DOCUMENTS

| | | | |
|---|---|---|---|
| 9,594,649 B2 * | 3/2017 | Yang .................... | G06F 11/202 |
| 9,705,974 B2 * | 7/2017 | Reddy .................... | H04L 67/38 |

(Continued)

OTHER PUBLICATIONS https://wiki.openstack.org/wiki/Congress OpenStack Congress—VM-placement engine PoC issued by COMODO RSA on Jul. 15, 2015.

(Continued)

*Primary Examiner* — Melvin H Pollack
(74) *Attorney, Agent, or Firm* — Jackson Walker LLP; Christopher J. Rourk (57) ABSTRACT

A system for managing networked devices comprising a plurality of racks of computing devices, each rack computing device further comprising a plurality of constraints and configured to operate one or more hosted systems, each rack comprising a bit vector stored in a data memory defining the minimum available set of constraints for each of the plurality of rack computing devices. A plurality of enterprises, each comprising one or more enterprise computing device configured to operate a virtual network system that is configured to interactively operate with the one or more hosted systems of one of the rack computing devices. A network function virtualization system configured to receive a service request and to determine that a new hosted system is required to respond to the service request, and to select a rack for instantiation of the new hosted system as a function of the plurality of bit vectors.

20 Claims, 5 Drawing Sheets

(56) References Cited

U.S. PATENT DOCUMENTS

| | | | | |
|---|---|---|---|---|
| 9,733,985 | B2* | 8/2017 | Iyoob | G06F 9/5077 |
| 9,769,050 | B2* | 9/2017 | Herdrich | H04L 43/50 |
| 9,774,541 | B1* | 9/2017 | Herzog | H04L 47/78 |
| 9,781,016 | B1* | 10/2017 | Marquardt | H04L 41/5054 |
| 9,792,243 | B2* | 10/2017 | Blevins | G06F 13/20 |
| 9,794,370 | B2* | 10/2017 | Abbasi | H04L 67/32 |
| 9,806,979 | B1* | 10/2017 | Felstaine | H04L 43/10 |
| 9,843,479 | B2* | 12/2017 | Rosa De Sousa Teixeira | H04L 41/0816 |
| 9,847,936 | B2* | 12/2017 | Jani | H04L 45/44 |
| 9,853,914 | B1* | 12/2017 | Felstaine | H04L 47/823 |
| 2016/0173329 | A1* | 6/2016 | Latham | H04L 41/0806 370/254 |
| 2016/0301632 | A1* | 10/2016 | Anand | H04L 47/125 |
| 2016/0380886 | A1* | 12/2016 | Blair | H04L 45/50 398/49 |
| 2017/0046206 | A1* | 2/2017 | Kofkin-Hansen | G06F 9/5077 |
| 2017/0116019 | A1* | 4/2017 | Miller | G06F 9/45558 |
| 2017/0116021 | A1* | 4/2017 | Miller | G06F 9/45558 |
| 2017/0180273 | A1* | 6/2017 | Daly | H04L 69/22 |
| 2017/0272311 | A1* | 9/2017 | Kerpez | H04L 41/082 |
| 2017/0300353 | A1* | 10/2017 | Yu | H04L 29/08 |
| 2017/0302534 | A1* | 10/2017 | Uberoy | H04L 41/12 |
| 2017/0324681 | A1* | 11/2017 | Johnsen | H04L 49/358 |
| 2017/0331578 | A1* | 11/2017 | Rostami | H04J 14/0213 |
| 2017/0366395 | A1* | 12/2017 | Goldfarb | H04L 41/0803 |
| 2017/0366475 | A1* | 12/2017 | Raza | H04L 41/26 |

OTHER PUBLICATIONS https://www.openstack.org/summit/vancouver-2015/summit-videos/presentation/helping-telcos-go-green-and-save-ppex-via-policy, 2015.

Fang et al., "VMPlanner: Optimizing virtual machine placement and traffic flow routing to reduce network power costs in cloud data centers", Computer Networks, 2012, pp. 1-18.

Krishnan et al., "NFVIaaS Architectural Framework for Policy Based Resource Placement and Scheduling", Internet Research Task Force(IRTF), Mar. 2016, pp. 1-13.

* cited by examiner

SYSTEM AND METHOD FOR POLICY-BASED SMART PLACEMENT FOR NETWORK FUNCTION VIRTUALIZATION

TECHNICAL FIELD

The present disclosure relates generally to management of computing devices, and more specifically to a system and method for providing policy-based smart placement for network function virtualization.

BACKGROUND OF THE INVENTION

Network function virtualization is a term of art that refers to providing traditional network functions in a virtual network environment, such as a Citrix virtual network. In such virtual network environments, users access the virtual network from a terminal using a browser-based client, a thin client or other suitable systems, and a virtual network provider sets up virtual network facilities to support the user's terminal session.

SUMMARY OF THE INVENTION

A system for managing networked devices is disclosed that includes racks of computing devices, each rack computing device further comprising a plurality of constraints and configured to operate one or more hosted systems. Each rack includes a bit vector stored in a data memory defining the minimum available set of constraints for each of the rack computing devices. A plurality of enterprises having enterprise computing devices such as user computers are configured to operate a virtual network system that is configured to interactively operate with the one or more hosted systems of one of the rack computing devices. A network function virtualization system is configured to receive a service request and to determine that a new hosted system is required to respond to the service request, and to select a rack for instantiation of the new hosted system as a function of the plurality of bit vectors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

Network function virtualization (NFV) is a technology that can be used to address technical problems associated with providing value-added services such as firewall services, intrusion detection systems (IDS), intrusion prevention systems (IPS), encryption and other suitable services in a scalable and agile fashion, and also in a cost-effective manner using readily available components, such as end stations and switches. NFV can be deployed in fixed line networks, mobile networks, data center networks and other suitable applications.

When using NFV to provide service agility and to deal with elastic demands, one of the problems is to be able to determine which server in the data center to instantiate for a given new service. This problem can be formulated as a multi-constraint optimization problem. Once the services have been instantiated, they need to be joined together to create a service chain. The present disclosure includes the service placement portion, identifying the various constraints used therein and other variables.

Distributed NFV edge data centers such as central offices are typically constrained in energy, computing power, storage and other operational parameters. The present disclosure utilizes dynamic bin packing of workloads into a minimal set of servers and powering off unused servers. Optimal loading of servers is important because servers have a non-linear power profile. The present disclosure is also applicable to a single server, such as by minimizing the number of active cores. Important server constraints related to the present disclosure include server reliability, hardware acceleration, single root I/O virtualization (SR-IOV) support, boot time, backup virtual network functions (VNF)/virtual machines (VM) in different physical servers/racks, and other server constraints.

Important network constraints related to the present disclosure include the availability of service function forwarder (SFF)/network virtualization edge (NVE) function and resources in top of rack (ToR) or virtual switch (vSwitch), placing backup VNF in a different rack (to allow for high availability (HA) without involving the VNF application), bandwidth (BW) considerations for inter-data center (DC) topology, and other constraints.

Important storage constraints related to the present disclosure include the type of storage (HDD vs SSD vs Hybrid), the availability of converged infrastructure, and other constraints.

These constraints can be mapped as a linear programming (LP) problem, such as dealing with CPU, memory, bandwidth and availability of hardware acceleration. Other constraints can be added in a similar fashion.

In one exemplary embodiment, a linear programming objective function can be formulated, such as:

Min. of $\Sigma h((X^*\text{MemMax}[h]-\text{MemUtil}[h])+(X^*\text{CpuMax}[h]-\text{CpuUtil}[h])+(X^*\text{NifBw}[h]-\text{NifBw}[h]))$ where the following linear programming constraints are imposed:

$\Sigma h$ Map[g][h]=1 (guest can map to only one host)
Map[g][h]$\leq$HWAccHosts[h] (guest can map only to hosts with HW acceleration support)
HWAccHosts[h]=1 (hosts with HW acceleration support)
0 (hosts with no HW acceleration support)

Where
G is a guest (VM, Container etc.) and H is a host (physical server)
HWAccHosts is the array of hosts with HW acceleration support
Map is the array of mapping of guests to hosts
X is the fraction of the total resources available on a host (prevent overloading)
MemMax is the maximum memory and MemUtil is current memory utilization for a host
CpuMax is the maximum number of cores and CpuUtil is current CPU utilization for a host
NifMax is the maximum bandwidth of network interface and NifBw is current network interface utilization for a host Using linear programming with multiple constraints on large problem sets can take very long, and there are some reasonable assumptions that can be used to simplify the algorithm. The first assumption is that racks comprise uniform servers. In other words, all servers in a rack would satisfy the same set of constraints, such as SR-IOV constraints, HA constraints and others. This assumption allows the problem to be decomposed to the rack level. Because a rack can provide information pertaining to the server capacity of its least used server, the present disclosure can be used to first find a rack to place the VNF/VM/Container in, and then to find a suitable server within that rack. One downside of this process is that the best placement might not be found, such as the best rack and server for the placement, but one that is reasonably good can be identified.

The constraints can be represented by a vector of bits. For example, when looking to place a VNF/VM/container in a server of a given type, a rack can be identified where at least all of the bits in the associated vector are set. Another option is to have "rack types" and specify the constraints by saying which "rack types" are acceptable for a given VNF/VM/container. Other suitable approaches can also or alternatively be used.

In one exemplary embodiment, the algorithm can work as follows. The set of the racks can be pruned to find eligible racks based on criteria such as HA, proximity, and the features in the bit vector. The rack with least capacity server that can satisfy the request is then found.

In regards to batching of requests, such as for setting up a number of VNFs/VMs/Containers to handle a viral event, the racks can provide data that specifies the number of servers that satisfy a certain capacity. For example, a rack can maintain a table that specifies the number of VNFs/VMs/Containers it can support for a given capacity, where capacity profiles can be defined for a given amount of CPU, data memory, storage or other parameters. Batch requests can also include a physical proximity constraint across multiple VNFs/VMs/Containers in a batch to help with the performance of service chaining, such as whether the same server, the same rack or any other suitable physical constraints apply.

The present disclosure can include an algorithm that first attempts to satisfy the proximity constraint by searching for the specified constraint (server, rack and so forth), but which otherwise tracks the best available solution in case a solution cannot be found that satisfies the proximity constraint.

In another exemplary embodiment, deployment data can be generated and stored for VNFs/VMs/Containers and used to determine which network functions are used in common and to apply those combinations more effectively, such as by creating aggregates of VNFs/VMs/Containers. For example, it may be determined that firewall and Internet Protocol security Virtual Private Networks (IPsec VPN) are commonly used, and that a proximity constraint to place the VNFs/VMs/Containers that are used to implement those services near one another (such as in the same server or rack) is optimal, such as to minimize resource fragmentation when service chains are removed. This process can be used to perform optimization based on aggregates even after initial placement.

The placement of the functions that can be aggregated can be dynamically adjusted until the VNFs/VMs/Containers are placed in the same server/rack. This process can be useful during heavy loads, to consolidate resources as they are fragmented over time (as service chains come and go, resources will get fragmented and consolidation will be needed), and using this process to consolidate also makes it less critical to find an optimized initial placement.

In order to implement HA, backups can be 1:1 or N:M (where M<N), and can be either active-active or active-standby. In the active-active case, workload consolidation can be applied during periods of underutilization. The load balancer can be responsible for reassigning flows away from the VNF/VM/Container that are being removed from service. Placement of the backup can be specified as being in a different rack, in a different aisle/pod, or in other suitable locations.

Backups for batch requests usually requires a pruning of ineligible racks. Since a batch request can be satisfied by placing VNF/VM/Container in different racks or different aisle/pods, the pruning may have to be different for each VNF/VM/Container. One way to solve this problem is force the primary batch of VNFs/VMs/Containers assignments into one set of racks (or aisle/pods), and the backup batch of VNFs/VMs/Containers into a different set of racks (or aisle/pods).

In one exemplary embodiment, an algorithm can be used where the number of racks is designated by R, the number of "rack types" is designated by T, and where the server attributes are covered by the rack type. The number of buckets can be designated by N, where each bucket is the number of servers of a given capacity, and a server will appear in all buckets at or below its capacity. The number of servers within a rack can be designated as S. The algorithm can include a pruning stage, where racks that don't match one of the requested rack types are removed and has a computational time complexity that is O(R.T). Alternatively, a rack list can be maintained for each rack type, and the rack list can be scanned in order of rack type preference, or other suitable processes can also or alternatively be used. Racks that don't have the bucket number corresponding to the requested capacity can be skipped, which can be done in computational time complexity that is O(R) (i.e. no servers at the requested capacity in that rack).

The VNF/VM/Container can be placed at the first available rack that does not violate HA policy. Within a rack, a particular server can be selected that has the capacity and is the best fit, which can be done with a computational time complexity that is O(S). The selected server must not violate HA policy. If best fit is not required, then a list of servers can be maintained for each bucket, and the server at the head of the list can be used, which reduces the computational time complexity to O(1). The buckets for that rack can then be updated to reflect the new allocation in a computational time complexity that is O(N). The overall computational time complexity for this algorithm is thus O(R.T+S+N) for a best fit, and is O(R.T+N) if a best fit is not necessary.

The present disclosure can be used to address network and storage constraints, and some computing capacity constraints, such as by allowing the server type to be selected for VNF/VM/Container, which functionality is missing in current orchestration frameworks. In addition, joint optimization can be addressed across multiple sub-systems (compute, storage, network and so forth) which is also missing in current orchestration frameworks. The disclosed algorithm allows operation at the rack level and groups racks into "rack types," which requires racks to be homogenous in order to simplify the algorithm. The present disclosure uses server capacity buckets to quickly determine a number of available VNFs/VMs/Containers of a given capacity in a rack. Batch placement for multiple VNFs/VMs/Containers can be provided, and a proximity constraint supports HA requirements. The disclosed use of VNF aggregates takes further advantage of the proximity constraint.

The present disclosure thus recognizes that existing solutions use constraint-based optimization techniques only for the computing sub-system, such as an objective function to maximize server utilization from a compute perspective (CPU, memory). Backing up VNF/VM in a different physical server and minimizing server under-utilization are constraints that are addressed by the present disclosure but which are not addressed by existing solutions, because they do not handle network and storage constraints, and they miss joint optimization across multiple sub-systems. By focusing on VNF placement, rather than optimizing bandwidth between VNFs/VMs/Containers, bandwidth is only considered as a constraint that needs to be satisfied, not optimized.

Figure 1:
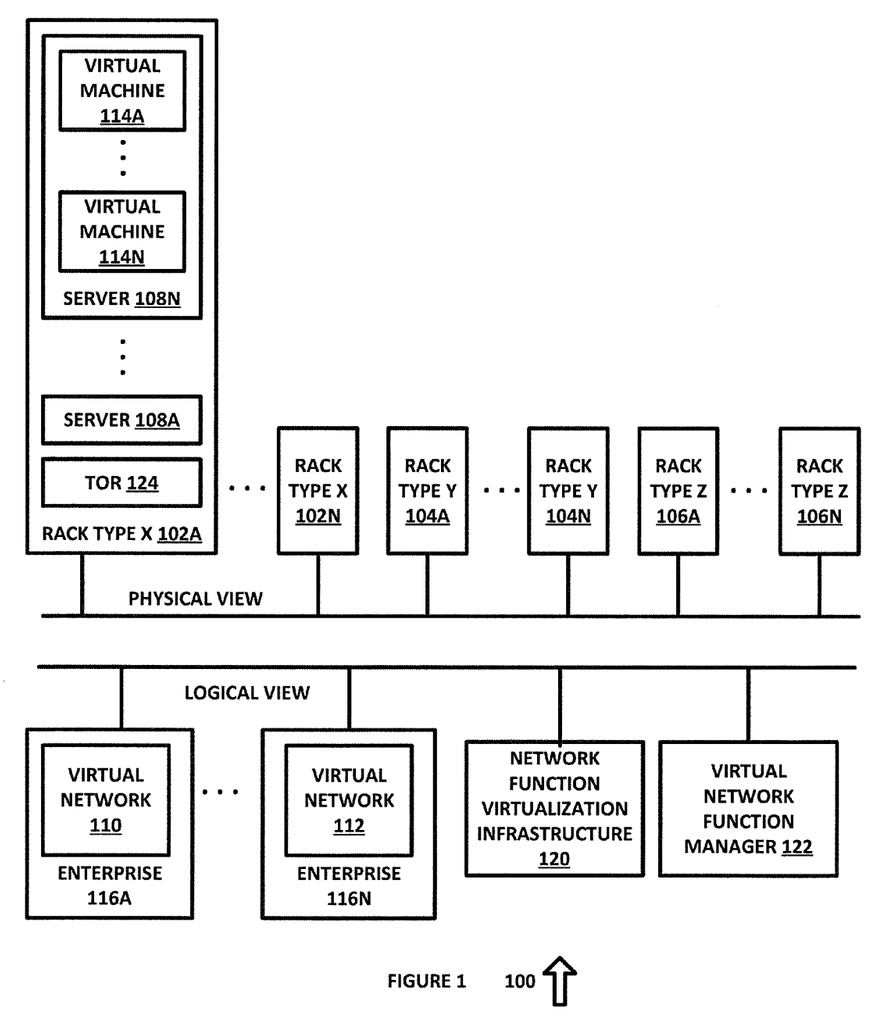
FIG. 1 is a diagram of a system for network function virtualization, in accordance with an exemplary embodiment of the present disclosure.

FIG. 1 is a diagram of a system 100 for network function virtualization, in accordance with an exemplary embodiment of the present disclosure. System 100 optimizes placement of VNFs/VMs/Containers in servers and racks, by categorizing racks based on attributes and server capacity to allow for rapid identification of racks that can be used to handle additional VNF/VM/Container loads without increased computing time and complexity that can result from seeking for the optimal load allocation.

System 100 includes rack types X 102A through 102N, rack types Y 104A through 104N, rack types Z 106A through 106N, enterprises 116A through 116N, network function virtualization infrastructure 120 and virtual network function manager 122. Each rack can further include servers 108A through 108N, each having virtual machines 114A through 114N, and ToR 124. Each of the sub-components or sub-systems of system 100 can be implemented in hardware or a suitable combination of hardware and software.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Rack types X 102A through 102N, rack types Y 104A through 104N and rack types Z 106A through 106N can be implemented as rack-mounted servers, blade servers or other suitable hardware and software, such as commercially available Dell rack mounted servers or blade servers and associated software. The rack type (X, Y, Z) is an exemplary indicator of server attributes or constraints that can be supported by each rack, such as reliability constraints (such as the mean time between failures, mean time to repair), hardware acceleration constraints (such as an encryption engine, a dedicated processor for analytics), I/O virtualization constraints (such as SR-IOV support), boot up time constraints (operating system availability), or other suitable constraint attributes. The identification of these constraints allows premium service policies to be mapped to more reliable servers, HW accelerated servers and for other suitable purposes.

Servers 108A through 108N are used to host virtual machines 114A through 114N, which can also or alternatively be virtual network functions, containers or other suitable virtual network resources that are created and closed down in response to network loading conditions, spinning up new services or for other suitable purposes. Each rack also includes ToR system 124 that is used to provide connectivity to network function virtualization infrastructure 120 and virtual network function manager 122.

Enterprises 116A through 116N utilize system 100 to provide virtual network capability. In one exemplary embodiment, enterprises 116A through 116N can be a suitable combination of mobile, home, small office, large enterprise or other users or groups of users that utilize virtual network functions of a virtual network, such as that provided by VMware, Microsoft Hyper-V, Citrix Xen or other suitable network virtualization solution. Each of enterprises 116A through 116N can have highly variable requirements for VNF/VM/Container loads, and use system 100 to support those loads.

Network function virtualization infrastructure 120 and virtual network function manager 122 provide support functions for enterprises 116A through 116N, to set up and configure VNF/VM/Container loads on one or more of servers or racks type X 102A through 102N, racks type Y 104A through 104N or racks type Z 106A through 106N, and to shut down the VNF/VM/Container loads when they are no longer needed. In one exemplary embodiment, network function virtualization infrastructure 120 and virtual network function manager 122 can be implemented using the commercially available Dell Network Function Virtualization platform hardware and software components.

Figure 2:
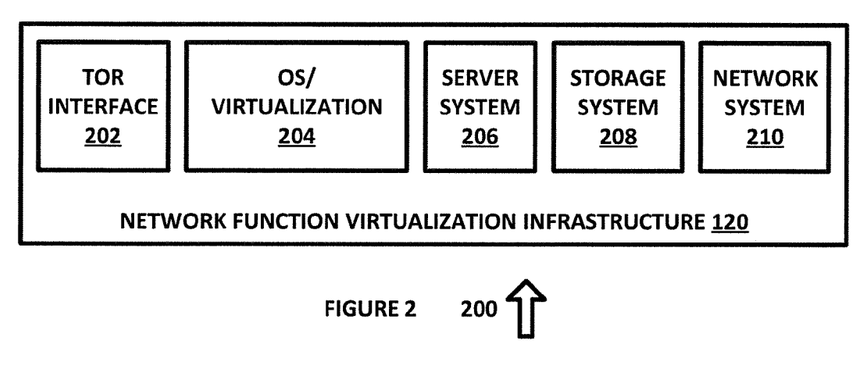
FIG. 2 is a diagram of a system for providing network function virtualization infrastructure, in accordance with an exemplary embodiment of the present disclosure.

FIG. 2 is a diagram of a system 200 for providing network function virtualization infrastructure, in accordance with an exemplary embodiment of the present disclosure. System 200 includes network function virtualization infrastructure 120 and ToR interface 202, OS/virtualization 204, server system 206, storage system 208 and network system 210, each of which can be implemented in hardware or a suitable combination of hardware and software.

ToR interface 202 provides an interface to ToR 124 in racks that are configured to be operated in conjunction with system 200, such as to allow system 200 to obtain data on server utilization and other suitable parameters to support network function virtualization, such as an N-bit parameter that has dedicated bits for defining server capacity, hardware acceleration capability, boot time, reliability parameters and other suitable data, as well as VNF/VM/Container loading parameters. ToR interface 202 can facilitate status query and update functions for rack status indication, rack configuration and instantiation of VNFs/VMs/Containers, and other suitable functions. In one exemplary embodiment, ToR interface 202 can be used to facilitate interchangeability of racks in system 100, to allow new racks to be implemented without modification to other racks or components of system 200, by specifying system parameters or in other suitable manners.

OS/virtualization system 204 configures an operating system to run different applications that are handled by multiple users on a single server. In one exemplary embodiment, OS/virtualization system 204 can configure an operating system for deployment to a server within a rack, in order to optimize deployment of VNFs/VMs/Containers within racks of system 100, in accordance with the specific parameters for a given rack, or in other suitable manners. OS/virtualization system 204 is configured to allow it to be replaced without impacting the operation of other components of system 100, such as by specifying the interface and operational constraints for OS/virtualization system 204.

Server system 206 configures a server to run different applications. In one exemplary embodiment, server system 206 can configure a server for deployment within a rack, in order to optimize deployment of VNFs/VMs/Containers in conjunction with the server in system 100, in accordance with the specific parameters for a given server and/or application, or in other suitable manners. Server system 206 is configured to allow it to be replaced without impacting the operation of other components of system 100, such as by specifying the interface and operational constraints for server system 206.

Storage system 208 configures storage devices for use with different applications. In one exemplary embodiment, storage system 208 can configure a storage device for use with virtualized network functions, in order to optimize deployment of VNFs/VMs/Containers in conjunction with the storage device in system 100, in accordance with the specific parameters for a given rack and/or application, or in other suitable manners. Storage system 208 is configured to allow it to be replaced without impacting the operation of other components of system 100, such as by specifying the interface and operational constraints for storage system 208.

Network system 210 configures a network to run different applications. In one exemplary embodiment, network system 206 can configure a network for communications with distributed racks, storage, users and other components of system, in order to optimize deployment of VNFs/VMs/Containers in conjunction with the network in system 100, in accordance with the specific parameters for a given server and/or application, or in other suitable manners. Network system 210 is configured to allow it to be replaced without impacting the operation of other components of system 100, such as by specifying the interface and operational constraints for network system 210.

In operation, system 100 provides network function virtualization infrastructure for use in a distributed network virtualization function system.

Figure 3:
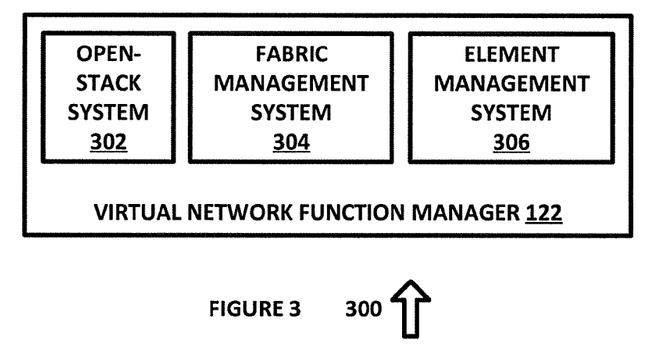
FIG. 3 is a diagram of a system for providing network function virtualization management, in accordance with an exemplary embodiment of the present disclosure.

FIG. 3 is a diagram of a system 300 for providing network function virtualization management, in accordance with an exemplary embodiment of the present disclosure. System 300 includes virtual network function manager 122 and OpenStack system 302, fabric management system 304 and element management system 306, each of which can be implemented in hardware or a suitable combination of hardware and software.

OpenStack system 302 provides control of hardware pools for processing, storage, and networking resources throughout a virtualized network function environment, such as system 100. In one exemplary embodiment, OpenStack system 302 can be configured to utilize the OpenStack open source cloud computing system or other suitable cloud computing management systems. OpenStack system 302 is configured to allow it to be replaced without impacting the operation of other components of system 100, such as by specifying the interface and operational constraints for OpenStack system 302, or in other suitable manners.

Fabric management system 304 is configured to manage multiple fabrics from a single UI-based console, such as by using the commercially available Dell Active Fabric Management system or other suitable systems. In one exemplary embodiment, fabric management 304 can automate the design and deployment of multi-tier fabric topologies, such as by using customizable design templates or in other suitable manners. Northbound API integration can be provided with a variety of platform element managers, including but not limited to VMware, vSphere and OpenStack Neutron. Fabric management system 304 can also provide support for discovering and integrating existing switching fabric installations including virtual switches. Fabric management system 304 is configured to allow it to be replaced without impacting the operation of other components of system 100, such as by specifying the interface and operational constraints for fabric management system 304.

Element management system 306 is configured to discover, configure, monitor and manage networking devices in system 100, such as by using the commercially available Dell OpenManage Network Manager or other suitable systems. In one exemplary embodiment, element manager 306 can discover, configure, monitor and manage networking devices such as racks, servers, storage or other suitable devices. Element management system 306 is configured to allow it to be replaced without impacting the operation of other components of system 100, such as by specifying the interface and operational constraints for element management system 306.

Figure 4:
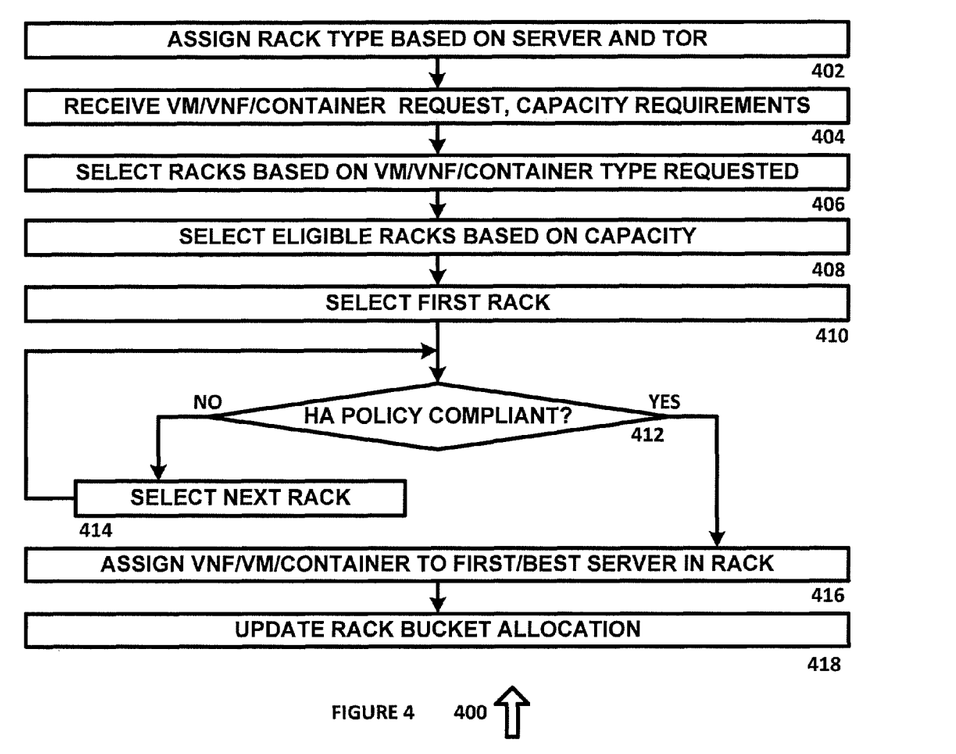
FIG. 4 is a diagram of an algorithm for providing network function virtualization for individual VM/VNF/Container requests, in accordance with an exemplary embodiment of the present disclosure.

FIG. 4 is a diagram of an algorithm 400 for providing network function virtualization for individual VM/VNF/Container requests, in accordance with an exemplary embodiment of the present disclosure. Algorithm 400 can be implemented in hardware or a suitable combination of hardware and software.

Algorithm 400 begins at 402, where rack type data are assigned to each rack of a plurality of racks as a function of server and ToR capabilities. In one exemplary embodiment, each rack can include a ToR system that allows the rack to interface with a network function virtualization system and which specifies the configuration parameters of the servers contained with the rack, such as hardware acceleration capability, boot time, reliability parameters and other suitable configuration parameters. The rack parameters can be assigned at setup, on a periodic basis or in other suitable manners. The algorithm then proceeds to 404.

At 404, a request for one or more VM/VNF/Container is received that is used to identify a server type, server capacity requirements and other suitable data. In one exemplary embodiment, the request can be received from an enterprise though a ToR system or other suitable systems at a network function virtualization system or other suitable systems. The algorithm then proceeds to 406.

At 406, a set of eligible racks are selected based on the VM/VNF/Container types requested, as a function of configuration parameters, capacity requirements and other suitable parameters. In one exemplary embodiment, a query can be generated and transmitted to each rack that is configured to be used with a network function virtualization system, and the responses can be used to select racks that have configuration parameters that match or exceed the entered configuration parameters, capacity requirements or other parameters. In another exemplary embodiment, the configuration parameters, capacity requirements and other parameters for each rack can be periodically transmitted to a central virtual network function manager or other suitable system, and can be used to update a list of associated parameters for each rack, or other suitable processes can also or alternatively be used. The algorithm then proceeds to 408.

At 408, eligible racks are selected based on capacity, such as by selecting each rack that has the minimum required capacity, racks that have the highest capacity, racks that have a capacity that is closest to the required capacity or in other suitable manners. The algorithm then proceeds to 410.

At 410, the first rack in a list of available racks is selected, and the algorithm then proceeds to 412, where it is determined whether the selected rack complies with an HA policy, such whether the rack satisfies redundancy, back up, failover, storage or other suitable parameters. If the first rack does not satisfy the HA parameters, the algorithm proceeds to 414 where the next rack is selected, and then returns to 412. Otherwise, the algorithm proceeds to 416.

At 416, the VNF/VM/Container is assigned to the first available server in the rack, the best available server in the rack, or in other suitable manners, such as by configuring the server with a suitable operating system, by allocating required storage and network resources, by running fabric or element management processes or in other suitable manners. The algorithm then proceeds to 416 where the rack bucket allocation data are updated.

In operation, algorithm 400 allows a VNF/VM/Container to be allocated to a rack/server in a network function virtualization system, by identifying suitable candidates for the VNF/VM/Container and then by configuring the selected rack/server to support the VNF/VM/Container.

Figure 5:
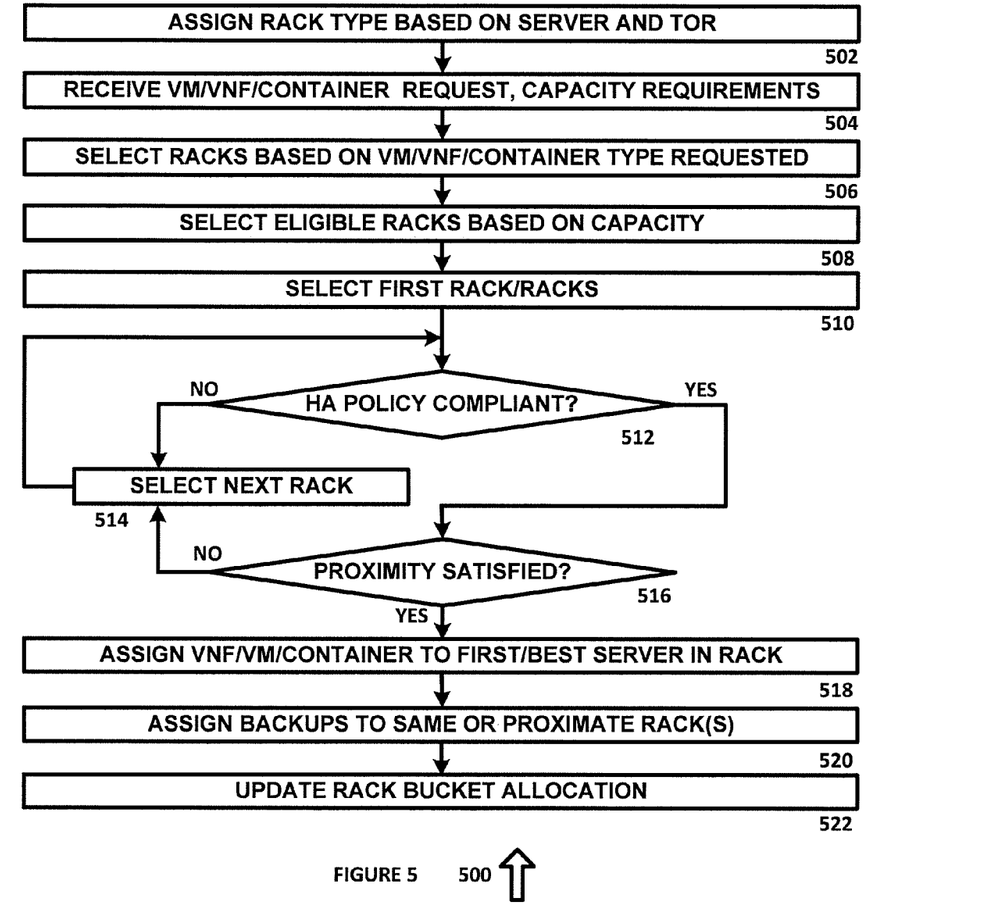
FIG. 5 is a diagram of an algorithm for providing network function virtualization for batch VNF/VM/Container requests, in accordance with an exemplary embodiment of the present disclosure.

FIG. 5 is a diagram of an algorithm 500 for providing network function virtualization for batch VNF/VM/Container requests, in accordance with an exemplary embodiment of the present disclosure. Algorithm 500 can be implemented in hardware or a suitable combination of hardware and software.

Algorithm 500 begins at 502, where rack type data are assigned to each rack of a plurality of racks as a function of server and ToR capabilities. In one exemplary embodiment, each rack can include ToR system that allows the rack to interface with a network function virtualization system and which specifies the configuration parameters of the servers contained within the rack, such as hardware acceleration capability, boot time, reliability parameters and other suitable configuration parameters. The rack parameters can be assigned at setup, on a periodic basis or in other suitable manners. The algorithm then proceeds to 504.

At 504, a batch request for one or more VM/VNF/Container is received that is used to identify identifies server types, a rack type, rack capacity requirements, proximity requirements for HA and other suitable data. In one exemplary embodiment, the request can be received from an enterprise though a ToR system or other suitable systems at a network function virtualization system or other suitable systems. The algorithm then proceeds to 506.

At 506, a set of eligible racks are selected based on VM/VNF/Containe types requested, as a function of the configuration parameters, capacity requirements and other suitable parameters. In one exemplary embodiment, a query can be generated and transmitted to each rack that is configured to be used with a network function virtualization system, and the responses can be used to select racks that have configuration parameters that match or exceed the entered configuration parameters, capacity requirements or other parameters. In another exemplary embodiment, the configuration parameters, capacity requirements and other parameters for each rack can be periodically transmitted to a central virtual network function manager or other suitable system, and can be used to update a list of associated parameters for each rack, or other suitable processes can also or alternatively be used. The algorithm then proceeds to 508.

At 508, eligible racks are selected based on capacity, such as by selecting each rack that has the minimum required capacity, racks that have the highest capacity, racks that have a capacity that is closest to the required capacity or in other suitable manners. The algorithm then proceeds to 510.

At 510, the first rack or set of racks in a list of available racks is selected, and the algorithm then proceeds to 512, where it is determined whether the selected rack or set of racks complies with an HA policy, such whether the rack satisfies redundancy, back up, failover, storage or other suitable parameters. If the first rack or set of racks does not satisfy the HA parameters, the algorithm proceeds to 514 where the next rack or set of racks is selected, and then returns to 512. Otherwise, the algorithm proceeds to 516.

At 516, it is determine whether the proximity requirements of the rack or set of racks are met. In one exemplary embodiment, proximity requirements can be a function of HA policy, but where a batch request for additional VNFs/VMs/Containers is being processed, two or more servers in two or more different racks may need to be selected. In such configurations, the proximity data is used to determine whether to configure back up servers in a different rack, a different aisle/pod or in other suitable locations. If the proximity requirements are not met, the algorithm proceeds to 514 where the next rack or set of racks is selected, and the algorithm returns to 512. Otherwise, the algorithm proceeds to 518.

At 518, the VNF/VM/Container is assigned to the first available server in the rack, the best available server in the rack, or in other suitable manners, or set of racks, such as by configuring the server(s) with a suitable operating system(s), by allocating required storage and network resources, by running fabric or element management processes or in other suitable manners. The algorithm then proceeds to 520 where backups are allocated to the same racks, proximate racks or as otherwise required based on HA policy. The algorithm then proceeds to 522 where the rack bucket allocation data are updated.

In operation, algorithm 500 allows a batch of VNFs/VMs/Containers to be allocated to a rack(s)/server(s) in a network function virtualization system, by identifying suitable candidates for the VNF/VM/Container and then by configuring the selected rack/server to support the VNF/VM/Container.

Figure 6:
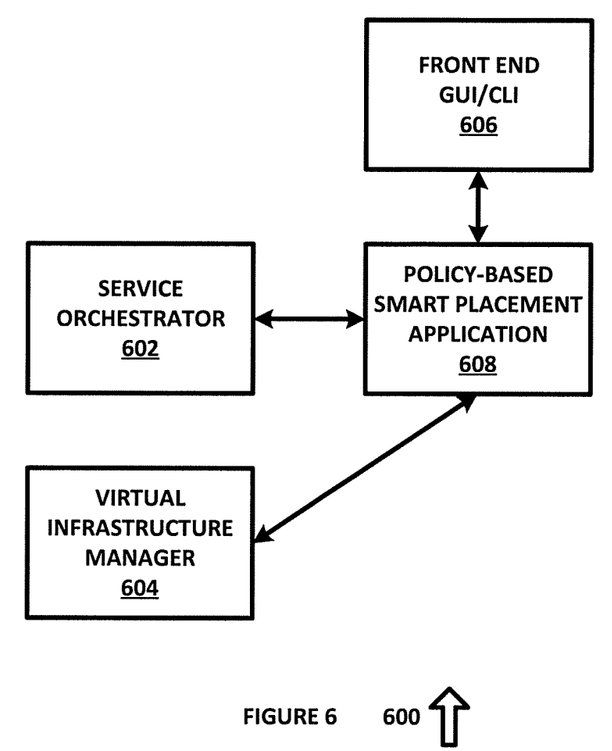
FIG. 6 is a diagram of a system for network function virtualization, in accordance with an exemplary embodiment of the present disclosure.

FIG. 6 is a diagram of a system 600 for network function virtualization, in accordance with an exemplary embodiment of the present disclosure. System 600 includes service orchestrator 602, virtual infrastructure manager 604, front end graphic user interface (GUI)/command line interface (CLI) 606 and policy-based smart placement application 608, each of which can be implemented in hardware or a suitable combination of hardware and software.

Service orchestrator 602 provides automated arrangement, coordination, and management of complex computer systems, middleware and services for network function virtualization and other suitable functions. In one exemplary embodiment, service orchestrator 602 can be implemented using Blue Planet, Overture Networks or other suitable service orchestration tools.

Virtual infrastructure manager 604 is configured to obtain information from components and software systems and to provide management capabilities, such as reporting, status analysis and other suitable management functions. In one exemplary embodiment, virtual infrastructure manager 604 can be implemented using the Open Daylight Project (ODL), OpenStack or other suitable systems and components.

Front end GUI/CLI 606 is configured to provide user interface control for management of constraints, such as a small form factor (SFF) in ToR and reliability, using ore or more policies. In one exemplary embodiment, front end GUI/CLI 606 can be implemented as one or more user-selectable icons, command line prompts and so forth.

Policy-based smart placement application 608 is configured to provide smart placement of network functions in a telecommunications company, such as by using real-time service functions including but not limited to firewall drops, analytics given infrastructure capacity constraints such as mini vE-CPE, to enable vE-CPE fixed/mobile business service to dynamically expand to a telecommunications or enterprise data center, for when new employees join a branch office, or for other suitable applications. Policy-based smart placement application 608 can also be implemented as a component of virtual infrastructure manager 604 or in other suitable manners.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:
1. A system for managing networked devices comprising:
a plurality of racks of computing devices, each rack computing device further comprising a plurality of constraints, and each rack represented by a bit vector stored in a data memory defining a minimum available set of constraints for each of the plurality of rack computing devices, each rack computing device further configured to operate one or more hosted systems;
a plurality of enterprises, each comprising one or more enterprise computing device configured to operate a virtual network that is configured to interactively oper- ate with the one or more hosted systems of one or more of the rack computing devices;

a network function virtualization system operating on a processor and configured to interface with the enterprise computing devices to receive a service request and to determine that a new hosted system is required to respond to the service request, and to select a rack of the plurality of racks for instantiation of the new hosted system as a function of the plurality of bit vectors.

2. The system of claim 1 wherein the plurality of racks further comprise one or more ToR switches and physical servers, with physical servers running virtual machines, virtual network functions or containers.

3. The system of claim 1 wherein the network function virtualization system is configured to instantiate one or more virtual machines, virtual network functions or containers using one or more of the plurality of racks in response to the service request.

4. The system of claim 1 wherein the network function virtualization system is configured to instantiate a batch of virtual machines, virtual network functions or containers using one or more of the plurality of racks in response to a batch service request.

5. The system of claim 1 wherein the network function virtualization system is configured to instantiate a batch of virtual machines, virtual network functions or containers using two or more of the plurality of racks in response to a batch service request as a function of rack location data.

6. The system of claim 1 wherein the constraints comprise one or more of a fraction of available resources, a maximum amount of memory, a current memory utilization and/or allocation, a maximum number of cores, a current CPU utilization and/or allocation, a maximum network interface bandwidth and a current network interface utilization and/or allocation.

7. The system of claim 1 wherein each rack further comprises a top of rack system and the network function virtualization infrastructure system is configured to interface with the top of rack system and the servers within each rack.

8. The system of claim 1 further comprising a network function virtualization infrastructure system configured to determine a server configuration and to instantiate a one or more virtual machines, virtual network functions or containers in response to the server configuration in the corresponding service request.

9. The system of claim 1 further comprising a network function virtualization infrastructure system configured to determine a storage configuration and to instantiate a one or more virtual machines, virtual network functions or containers in response to the storage configuration in the corresponding service request.

10. The system of claim 1 further comprising a network function virtualization infrastructure system configured to determine a network communications configuration and to instantiate a one or more virtual machines, virtual network functions or containers in response to the network communications configuration in the corresponding service request.

11. A method for managing networked devices comprising:

determining a plurality of constraints for each of a plurality of racks of computing devices;

storing a bit vector in a data memory to define a minimum available set of constraints for each of the plurality of rack computing devices;

configuring each rack computing device to operate one or more hosted systems;

configuring an enterprise computing device to operate a virtual network system that is configured to interactively operate with the one or more hosted systems of one or more of the rack computing devices;

configuring a network function virtualization infrastructure system to interface with the enterprise computing devices to receive a service request and to determine that a new hosted system is required to respond to the service request; and selecting with the network function virtualization system a rack of the plurality of racks for instantiation of the new hosted system as a function of the plurality of bit vectors.

12. The method of claim 11 further comprising instantiating one or more virtual machines, virtual network functions or containers with the network function virtualization infrastructure system using one or more of the plurality of racks in response to the service request.

13. The method of claim 11 further comprising instantiating a batch of virtual machines, virtual network functions or containers at one or more of the plurality of racks using the network function virtualization infrastructure system in response to a batch service request.

14. The method of claim 11 further comprising instantiating a batch of virtual machines, virtual network functions or containers at one or more of the plurality of racks using the network function virtualization infrastructure system in response to a batch service request.

15. The method of claim 11 further comprising configuring the network function virtualization infrastructure system to instantiate a batch of virtual machines, virtual network functions or containers using two or more of the plurality of racks in response to a batch service request as a function of rack location data.

16. The method of claim 11 wherein the constraints comprise one or more of a fraction of available resources, a maximum amount of memory, a current memory utilization and/or allocation, a maximum number of cores, a current CPU utilization and/or allocation, a maximum network interface bandwidth and a current network interface utilization and/or allocation.

17. The method of claim 11 wherein the network function virtualization system is configured to interface with the top of rack system and servers within each rack.

18. The method of claim 11 further comprising configuring a network function virtualization infrastructure system to determine a server configuration and to instantiate a one or more virtual machines, virtual network functions or containers in response to the server configuration in the corresponding service request.

19. The method of claim 11 further comprising configuring a network function virtualization infrastructure system to determine a storage configuration and to instantiate a one or more virtual machines, virtual network functions or containers in response to the storage configuration in the corresponding service request.

20. The method of claim 11 further configuring a network function virtualization infrastructure system to determine a network communications configuration and to instantiate a one or more virtual machines, virtual network functions or containers in response to the network communications configuration in the corresponding service request.

* * * * *